und States Patent (12) United States Patent
Lankinen (10) Patent No.: US 10,502,411 B2
(45) Date of Patent: Dec. 10, 2019

(54) ASSEMBLY AND A METHOD OF INSTALLING AN ASSEMBLY OF A PARTICLE SEPARATOR MODULE AND A HEAT EXCHANGE CHAMBER MODULE, AND A CIRCULATING FLUIDIZED BED BOILER WITH SUCH AN ASSEMBLY

(71) Applicant: Sumitomo SHI FW Energia Oy, Espoo (FI)

(72) Inventor: Pentti Lankinen, Varkaus (FI)

(73) Assignee: Sumitomo SHI FW Energia Oy, Espoo (FI)

( * ) Notice: Subject to any disclaimer, the term of this patent is extended or adjusted under 35 U.S.C. 154(b) by 270 days.

(21) Appl. No.: 15/563,627

(22) PCT Filed: Jan. 10, 2017

(86) PCT No.: PCT/FI2017/050008
§ 371 (c)(1),
(2) Date: Oct. 2, 2017

(87) PCT Pub. No.: WO2017/125641
PCT Pub. Date: Jul. 27, 2017

(65) Prior Publication Data
US 2018/0073723 A1   Mar. 15, 2018

(30) Foreign Application Priority Data

Jan. 19, 2016   (FI) ..................................... 20165029

(51) Int. Cl.
F22B 37/24   (2006.01)
F22B 31/00   (2006.01)
(Continued)

(52) U.S. Cl.
CPC ............ *F22B 31/003* (2013.01); *B23P 15/26* (2013.01); *F22B 31/0084* (2013.01); *F23C 10/10* (2013.01)

(58) Field of Classification Search
CPC ......... F22B 31/00; F22B 37/24; F22B 37/244
See application file for complete search history.

(56) References Cited

U.S. PATENT DOCUMENTS 5,393,315 A * 2/1995 Alliston ................. B01D 45/12
110/216
5,526,775 A   6/1996 Hyppänen
(Continued)

FOREIGN PATENT DOCUMENTS

EP   1 259 758 B2   3/2009
EP   2 361 148 B1   11/2013
(Continued)

OTHER PUBLICATIONS

Notification of and International Search Report and Written Opinion dated Apr. 5, 2017, in corresponding International Patent Application No. PCT/FI2017/050008.
(Continued)

*Primary Examiner* — Gregory A Wilson
(74) *Attorney, Agent, or Firm* — Venable LLP (57) ABSTRACT

A particle separator module and a heat exchange chamber module connectable to a circulating fluidized bed boiler. The particle separator module includes 2N vertically aligned steam tubes, N being an integer greater than one. Each of the vertically aligned steam tubes is attached to a boiler upper portion and extends downwards to a predetermined level. Each of the 2N vertically aligned steam tubes is attached to one of N first beams. Each of the N first beams is suspended to hang in a horizontal position at the predetermined level by two adjacent steam tubes of the 2N vertically aligned steam tubes. N second beams are attached in a horizontal position
(Continued)

to the top surface of the heat exchange chamber module, which is arranged to be suspended from the particle separator module by having each of the N second beams suspended by two adjacent beams of the N first beams.

27 Claims, 3 Drawing Sheets

(51) Int. Cl.
*F23C 10/10* (2006.01)
*B23P 15/26* (2006.01)

(56) References Cited

U.S. PATENT DOCUMENTS

| | | | |
|---|---|---|---|
| 6,305,330 B1 * | 10/2001 | Darling | F22B 31/0084 |
| | | | 110/245 |
| 7,818,942 B2 * | 10/2010 | Nakamitsu | F22B 37/24 |
| | | | 254/89 R |
| 8,020,297 B2 * | 9/2011 | Yoshino | F22B 37/24 |
| | | | 29/890 |
| 8,316,783 B2 * | 11/2012 | Lankinen | F22B 31/0007 |
| | | | 110/216 |
| 9,964,301 B2 * | 5/2018 | Lankinen | F22B 31/0015 |
| 10,309,643 B2 * | 6/2019 | Shimono | E04G 23/02 |
| 2018/0306434 A1 * | 10/2018 | Baum | F22B 31/0007 |

FOREIGN PATENT DOCUMENTS

| | | |
|---|---|---|
| EP | 2 884 165 A1 | 6/2015 |
| GB | 1 407 593 A | 9/1975 |
| JP | H06-323503 A | 11/1994 |
| WO | 2013/041764 A2 | 3/2013 |
| WO | 2015/185796 A1 | 12/2015 |
| WO | WO-2017025215 A1 * | 2/2017 ................ C10J 3/56 |

OTHER PUBLICATIONS

International Search Report dated Apr. 5, 2017, issued in corresponding International Patent Application No. PCT/FI2017/050008.

\* cited by examiner

ASSEMBLY AND A METHOD OF INSTALLING AN ASSEMBLY OF A PARTICLE SEPARATOR MODULE AND A HEAT EXCHANGE CHAMBER MODULE, AND A CIRCULATING FLUIDIZED BED BOILER WITH SUCH AN ASSEMBLY

CLAIM OF PRIORITY

This application is a U.S. national stage application of PCT International Application No. PCT/FI2017/050008, filed Jan. 10, 2017, which claims priority from Finnish Patent Application No. 20165029, filed Jan. 19, 2016.

TECHNICAL FIELD

The present invention relates to an assembly of a particle separator module and a heat exchange chamber module, a circulating fluidized bed boiler with such an assembly, and a method of installing such an assembly. More particularly, the present invention relates to different aspects of an assembly of a particle separator module and a heat exchange chamber module connectable in a circulating fluidized bed boiler, wherein the particle separator module comprises a cylindrical upper portion, a conical lower portion and a lower end that is sealably connectable to the top surface of the heat exchange chamber module so as to convey particles from the particle separator module to the heat exchange chamber module, when in use, in a circulating fluidized bed boiler.

BACKGROUND ART

Circulating fluidized bed boilers comprise a furnace and a particle separator in flow connection with an upper portion of the furnace to separate particles from exhaust gas discharged from the furnace. At least a portion of the separated particles is returned back from the particle separator to a lower portion of the furnace via a return channel. A heat exchange chamber comprising heat exchange surfaces embedded in a slow fluidized bed of particles is often arranged in the return channel. Such a heat exchange chamber with a fluidized bed of particles is a relatively heavy construction, the supporting of which requires special measures. The furnace and the particle separator of a large scale circulating fluidized bed boiler plant are usually top-supported from a supporting construction of the plant. According to conventional practice, the heat exchange chamber is either bottom-supported or it is integrated in a common structure with a side wall of the furnace. A bottom-supported heat exchange chamber requires complicated measures to compensate for differential thermal expansions of the units, as shown, for example, in international publication WO 2013/041764. A heat exchange chamber integrated to a side wall of the furnace, such as the one shown in U.S. Pat. No. 5,526,775, may cause lack of space for other systems to be assembled to the lower portion of the furnace.

European patent document EP 2 361 148 B1 discloses an assembly of a particle separator and a heat exchange chamber made as an integrated water tube construction supported to hang from the supporting structure of the boiler. This construction may be difficult to manufacture and to assemble, and the close integration may limit the possibilities to separately optimize the sizes and structures of the particle separator and the heat exchange chamber.

European patent document EP 1 259 758 B2 discloses an assembly comprising a particle separator module and a heat exchange chamber module in which the heat exchange chamber module is suspended from the particle separator module by means of suspension means comprising steam tubes. This construction is relatively simple, but it may still be relatively difficult to assemble, and it may limit the possibilities to separately optimize the sizes and structures of the particle separator and the heat exchange chamber.

An object of the invention is to provide an assembly of a particle separator module and a heat exchange chamber module, a circulating fluidized bed boiler with such an assembly, and a method of installing such an assembly, in which at least a portion of the above-mentioned and other problems of the prior art are minimized or eliminated.

DISCLOSURE OF THE INVENTION

The objects of the invention can be met substantially as disclosed in the claims, describing in more detail different embodiments of the invention.

According to one aspect, the present invention provides an assembly of a particle separator module and a heat exchange chamber module connectable in a vertical position to a circulating fluidized bed boiler, wherein the heat exchange chamber module comprises a top surface and the particle separator module is top-supportable and comprises a cylindrical upper portion with an outer wall having a tube wall construction, a conical lower portion and a lower end that is sealably connectable to the top surface of the heat exchange chamber module so as to convey particles from the particle separator module to the heat exchange chamber module when in use in connection with a circulating fluidized bed boiler. The particle separator module is provided with 2N vertically aligned steam tubes, wherein N is an integer greater than one, each of the vertically aligned steam tubes being attached to the cylindrical upper portion and extending downwards to a predetermined level located between the cylindrical upper portion and the lower end, and N first beams, wherein each of the 2N vertically aligned steam tubes is attached to one of the N first beams so that each of the N first beams is suspended to hang in a horizontal position at the predetermined level by two adjacent steam tubes of the 2N vertically aligned steam tubes, and the heat exchange chamber module is provided with N second beams attached in a horizontal position to the top surface of the heat exchange chamber module, wherein the heat exchange chamber module is arranged to be suspended from the particle separator module by having each of the N second beams suspended by two adjacent beams of the N first beams.

The aspect of the present invention defined above provides the advantage that the particle separator and the heat exchange chamber are separate modules, the size and shape of which can be independently designed and optimized. The particle separator module and the heat exchange chamber module can be separately manufactured, and they can be connected together in a very simple and efficient way while being installed in connection with a circulating fluidized bed boiler. Thus, the particle separator module and the heat exchange chamber module can be designed based on the needs of the modules and their surrounding structures, and the installation of the modules can be realized especially economically in a short time schedule.

Each of the vertically aligned steam tubes is advantageously attached in an attaching region on the outer wall of the cylindrical upper portion of the particle separator. The attaching regions advantageously extend at least two meters in the vertical direction along the outer wall of the cylindrical upper portion of the particle separator module. This ensures good mechanical and thermal contact between the vertically aligned steam tubes and the tube wall construction of the upper portion of the particle separator module.

If N equals two, there are four vertically aligned steam tubes and the attaching regions of the four vertically aligned steam tubes advantageously form a horizontally rectangular pattern, which is especially advantageous in a rectangular case, i.e., when the heat exchange chamber has a rectangular horizontal cross section. Thereby, the top surface of the heat exchange chamber comprises two opposite edge portions parallel to each other, and the two second beams are advantageously attached to the two opposite edge portions. Then, the heat exchange chamber module is advantageously arranged to be suspended from the particle separator module by having the second beams disposed perpendicular to the first beams.

The heat exchange chamber module is advantageously arranged to be suspended from the particle separator module by having the N second beams suspended from the N first beams by means of 2N intermediate hanger rods, each of the intermediate hanger rods attaching an end section of a first beam to an adjacent end section of a second beam. Thus, the intermediate hanger rods preferably attach the first and second beams to each other at their end sections, in most cases, nearly at the ends of the beams, advantageously, at least symmetrically at both sides of the centers of the beams.

In a rectangular case, the distance between the second beams is advantageously the same as the distance between the respective opposite edge portions of the top surface of the heat exchange chamber module. Thus, the intermediate hanger rods are attached to the first beams at a distance corresponding to the distance between the respective opposite edge portions of the top surface of the heat exchange chamber module. Therefore, when the distance between the opposite edge portions of the top surface of the heat exchange chamber module is shorter than the length of the first beams, the intermediate hanger rods are attached to the end sections of the first beams, but at a distance from the actual ends of the first beams.

The second beams are advantageously attached to the two opposite edge portions of the top surface of the heat exchange chamber by multiple lower hanger rods distributed approximately evenly along the length of the edge portions. Thus, when the edge portions of the top surface extend further than the distance between the first beams, the length of the second beams is longer than the distance between the first beams, and the intermediate hanger rods are to be attached to the second beams at a distance from the actual ends of the second beams.

The cross section of the cylindrical upper portion of the particle separator module may be circular, but, according to a preferred embodiment of the present invention, the cylindrical upper portion has a polygonal horizontal cross section. The cross section then advantageously comprises 2M corner sections, wherein M is an integer greater than one, and the attaching regions of the vertically aligned steam tubes are located adjacent to the 2M corner sections in the outer wall of the cylindrical upper portion. Thus, it can be said that each of the vertically aligned steam tubes is attached to one of the corner sections. The simplest polygonal cross section is thus a square that has a vertically aligned steam tube attached to each of the corner sections.

If M equals three, the cross section of the cylindrical upper portion of the particle separator is hexagonal and comprises six corner sections. Then, it is possible that there are six vertical steam tubes, three first beams and three second beams. However, because the heat exchange chamber module usually has a rectangular cross section, the assembly with a particle separator having an upper portion with a hexagonal cross section is preferably asymmetric in the sense that there are four vertically arranged steam tubes, whereby a vertically aligned steam tube is attached in four pairwise adjacent corner sections but the remaining two corner sections are without a vertically aligned steam tube.

Advantageously, N equals two, M is an even number, such as four, six, or eight, whereby the number of corners is divisible by four. Then, the four vertically aligned steam tubes can be symmetrically attached to four of the corner sections. According to an advantageous embodiment of the present invention M equals six, and the cross section of the upper portion of the particle separator comprises twelve corner sections. Then, the construction can be made symmetric so that, in every third corner section, there is attached a vertically aligned steam tube, and in the other two of any three adjacent corner sections, there is not attached a vertically aligned steam tube.

In rectangular cases, an assembly of a particle separator module and a heat exchange chamber module, wherein a vertically aligned steam tube is attached only in every third corner section or, more generally, wherein there is an even number of corners without a vertically aligned steam tube between each of two corners wherein is attached a steam tube, is especially advantageous in terms of connectability with the furnace of a fluidized bed boiler. The advantageousness is based on the fact that, when the assembly is installed in its natural position, i.e., so that one of the second beams is parallel with an adjacent side wall of the furnace, then there is at the center, between each of two adjacent vertically aligned steam tubes, a face of the upper portion of the particle separator, which is either parallel or perpendicular to the adjacent side wall of the furnace. Thus, even if the particle separator is top-supported, additional side supports of the upper portion can then be arranged especially advantageously from the furnace or any structure aligned with the walls of the furnace.

According to an especially advantageous embodiment of the present invention, M equals eight, whereby the cross section of the upper portion of the particle separator comprises sixteen corner sections. The cylindrical upper portion of a particle separator module with sixteen corner sections can advantageously be formed of sixteen straight water tube panels. The panels can then be extended downwards and bent inwards in a symmetric way so as to form also the conical lower portion of the particle separator module, all the way to the lower end thereof.

The construction with sixteen corner sections can again be made symmetric so that in every fourth corner section is attached a vertically aligned steam tube, and in the other three of four adjacent corner sections, is not attached a vertically aligned steam tube. However, in view of the advantageousness of having an even number of adjacent corners without a vertically aligned steam tube, as described above, according to an even more advantageous embodiment of the present invention, the construction with sixteen corner sections is made asymmetric so that the number of adjacent corner sections without a vertically aligned steam tube is made to vary according to the series 4-2-4-2.

According to a preferred embodiment of the present invention, the heat exchange chamber module has a tube wall construction that is arranged not to be in direct flow connection with the tube wall construction of the cylindrical upper portion of the particle separator module. Thus, the tube wall constructions of the heat exchange chamber module and the particle separator module are to a large extent independent. To this end, the lower end of the particle separator module is sealably connectable to the top surface of the heat exchange chamber module by an especially simple means, by means of a plate sealing.

Because the tube wall construction of the heat exchange chamber module is not in direct flow contact with the tube wall construction of the particle separator, there are no tube wall connections to be made to the particle separator module when installing the heat exchange chamber module. It is thereby possible to manufacture the heat exchange chamber module nearly completely ready before the installation, so as to minimize manual manufacturing steps in the final location. Thus, the present invention renders possible an especially simple and rapid installation of the heat exchange chamber module.

Another advantage of the present invention is that, because the mechanical connection between the modules is made by the first and second beams, the length of which can be increased to any desired size, the width and depth of the heat exchange chamber module is not limited by the size of the particle separator module. Thus, the width and depth of the heat exchange chamber module can be, for example, clearly smaller or clearly greater than the diameter of the particle separator.

According to another aspect, the present invention provides a circulating fluidized bed boiler that comprises an assembly of a particle separator module and a heat exchanger chamber module according to any one of the embodiments described above.

According to still another aspect, the present invention provides a method of installing an assembly of a particle separator module and a heat exchange chamber module, as described above, to a supporting construction of a circulating fluidized bed boiler plant. Thus, the method comprises supporting the particle separator module from above to the supporting construction of the circulating fluidized bed boiler plant and suspending the heat exchange chamber module from the particle separator module by having each of the second beams suspended by two of the first beams.

The heat exchange chamber module is advantageously suspended from the particle separator module by having the second beams suspended by the first beams by means of intermediate hanger rods so that each of the hanger rods attaches an end section of a first beam to an adjacent end section of a second beam. The heat exchange chamber module is preferably suspended from the particle separator module by having two second beams that are disposed perpendicular to two first beams.

BRIEF DESCRIPTION OF THE DRAWINGS

In the following, the invention will be described with reference to the accompanying exemplary, schematic drawings, in which.

DETAILED DESCRIPTION OF THE DRAWINGS

Figure 1:
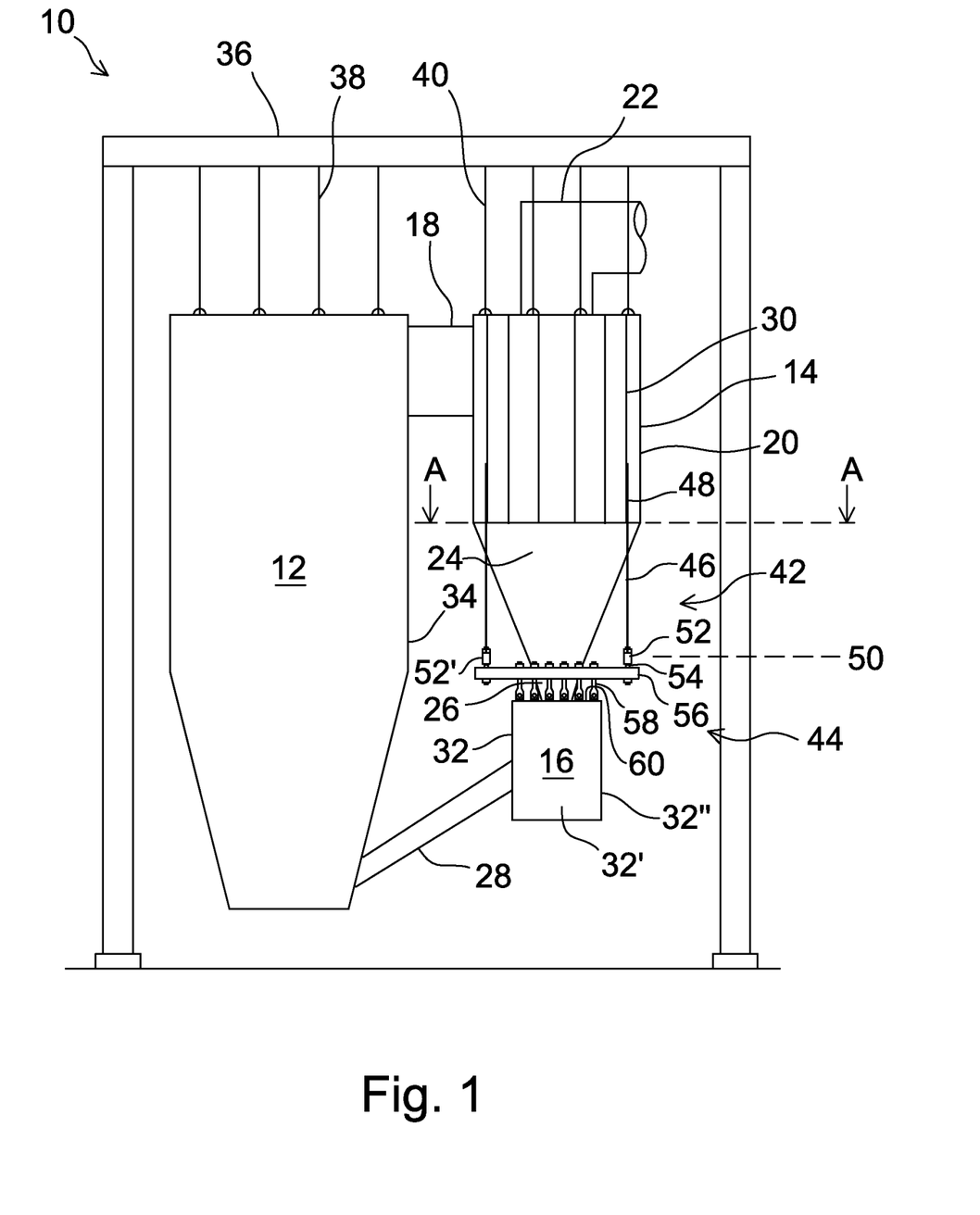
FIG. 1 schematically illustrates a side view of a circulating fluidized bed boiler plant comprising an assembly of a particle separator module and a heat exchange chamber module according to an embodiment of the invention.

FIG. 1 schematically shows a side view of a circulating fluidized bed boiler plant 10 comprising a furnace 12, a particle separator module 14, and a heat exchange chamber module 16 according to an exemplary embodiment of the present invention. In the following, the particle separator module 14 and the heat exchange chamber module 16 may alternatively be simply called the particle separator and the heat exchange chamber, the former forms being used especially when there is a need to emphasize that the particle separator 14 and the heat exchange chamber 16 are, in terms of manufacturing and installation, independent units, modules, which are connected together only during the installation of the assembly, by an especially simple means.

A flue gas discharge channel 18 connects an upper portion of the furnace 12 to a cylindrical upper portion 20 of the particle separator 14. A cleaned gas channel 22 is connected to the top of the particle separator 14 to convey cleaned flue gases from the particle separator 14 to further processing. Separated particles drop through a conical lower portion 24 and lower end 26 of the particle separator 14 to the heat exchange chamber 16. Cooled particles are conducted from the heat exchange chamber 16 through a return channel 28 to a lower portion of the furnace 12.

A horizontal cross section of the upper portion 20 of the particle separator 14 is, in this embodiment, a regular polygon with sixteen corners that are shown in FIG. 1 as vertical lines 30. The heat exchange chamber 16 has a rectangular horizontal cross section with one side face 32 being parallel with an adjacent side wall 34 of the furnace 12. Horizontal dimensions of the heat exchange chamber module 16 are in the embodiment of FIG. 1 clearly smaller than those of the particle separator module 14. Generally, an advantage of the assembly shown in FIG. 1 is that it does not limit the horizontal dimensions of the two modules with respect to each other. Thus, the horizontal dimensions of the heat exchange chamber module 16 can alternatively be, for example, greater than those of the particle separator module 14.

The furnace 12 and the particle separator 14 are supported to hang from a rigid support construction 36 of the boiler plant 10 by first upper hanger rods 38 and second upper hanger rods 40, respectively. The heat exchange chamber module 16 is arranged to hang from the particle separator module 14 by means of dedicated supporting means 42, 44 attached to the particle separator module 14 and the heat exchange chamber module 16, respectively.

The supporting means 42 attached to the particle separator module 14 comprise four vertically aligned steam tubes 46, each of the steam tubes being attached in an attaching region 48 to the cylindrical upper portion 20 of the particle separator 14. Usually, the steam tubes 46 are welded on four corners 30 of the cylindrical upper portion 20 of the particle separator 14 in the attaching regions 48, which extend advantageously at least two meters upwards from the lower end of upper portion 20 of the particle separator 14. The vertically aligned steam tubes 46 extend downwards from the lower end of the cylindrical upper section 20 of the particle separator 14 to a predetermined level 50 located between the cylindrical upper portion 20 and the lower end 26 of the particle separator module 14. The vertically aligned steam tubes 46 are usually, even though not shown in FIG. 1, portions of the steam generating system of the boiler plant 10, such as connecting tubes between primary and secondary superheaters.

The supporting means 42 attached to the particle separator module 14 comprise two first beams 52, 52' suspended to hang in horizontal position parallel to each other at the predetermined level 50 so that each of the first beams hangs from two adjacent steam tubes 46. When installing the heat exchanger module 16 in connection with the particle separator module 14, the first beams 52, 52' are connected by intermediate hanger rods 54 to the supporting means 44 attached to the heat exchange chamber module 16.

The supporting means 44 attached to the heat exchange module 16 comprise two second beams 56 attached by multiple lower hanger rods 58 in horizontal position to two opposite edge portions of the top surface 60 of the heat exchange chamber module 16. The heat exchange chamber module 16 is connected to the particle separator module 14 so that each of the second beams 56 is connected to the two first beams 52, 52' whereby the second beams 56 are disposed perpendicular to the first beams 52, 52'.

Figure 2:
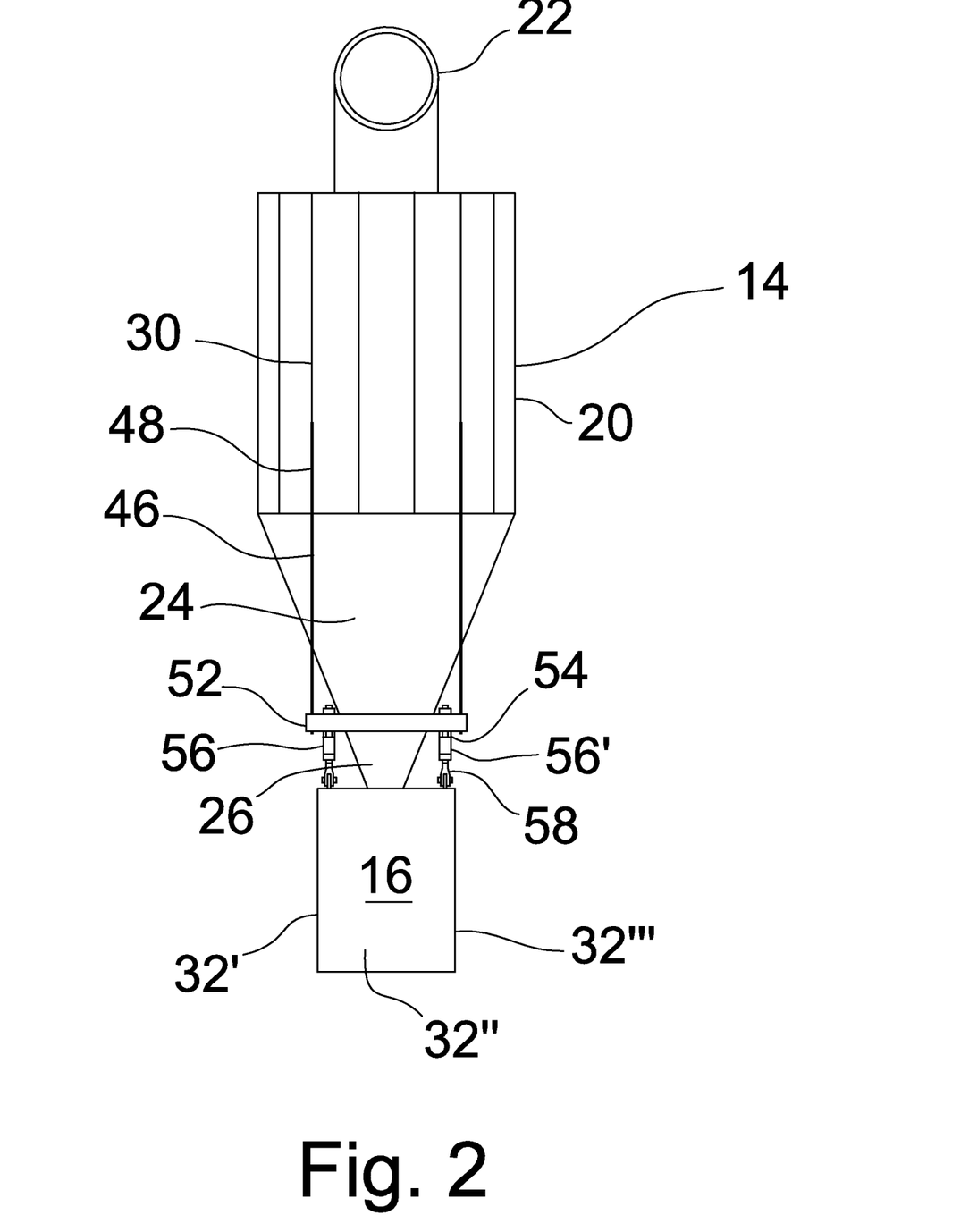
FIG. 2 schematically illustrates a rear side view of the assembly of the particle separator module and a heat exchange chamber module according to the first embodiment of the invention.

FIG. 2 schematically shows the assembly of the particle separator module 14 and heat exchange module 16 of FIG. 1 as a rear side view, i.e., from the side opposite to the furnace 12. The same reference numbers as those in FIG. 1 are used for the same parts in FIG. 2. Because the view angle of FIG. 2 is perpendicular to that of FIG. 1, for example, the side walls 32', 32", 32''' of the heat exchange chamber 16 seen in FIG. 2 differ from the side walls 32, 32", 32''' seen in FIG. 1. Also, in FIG. 2 can be seen only one first beam 52, but two second beams 56, 56', and the multiple lower hanger rods 58, which can be seen side by side in FIG. 1, are in FIG. 2 one after the other, and only the two outer-most of them can be seen.

By comparing FIGS. 1 and 2, it is apparent that that the attaching regions 48 are not arranged symmetrically in the circumference of the upper portion 20 of the particle separator module 14, but in the side view of FIG. 1 there are four empty corners between two attaching regions 48, whereas, in the rear side view of FIG. 2, there are only two empty corners between two attaching regions 48. This design leads naturally to an arrangement where the polygonal upper region of the particle separator 14 comprises a face, the face at the center between two attaching regions, parallel to each side face of the heat exchange chamber 16, whereby the same faces are also parallel to the side walls of the furnace 12 of the boiler 10. This arrangement is generally advantageous for the general layout of the boiler plant 10, and especially for providing side supports, not shown in the Figures, to the upper portion 20 of the particle separator 14.

Figure 3:
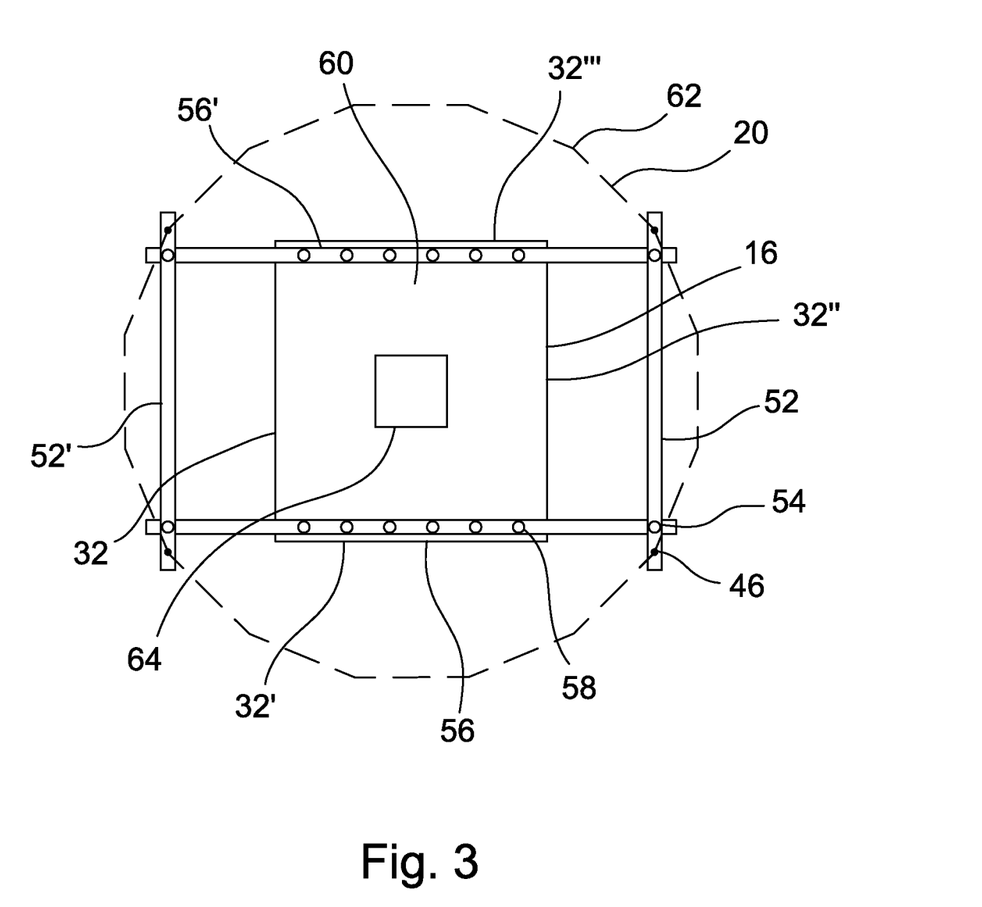
FIG. 3 schematically illustrates a horizontal cross section of the assembly of the particle separator module and a heat exchange chamber module according to the first embodiment of the invention.

FIG. 3 schematically shows a horizontal cross-sectional view of the connection of the heat exchange chamber 16 to the upper portion 20 of the particle separator 14 already shown in FIGS. 1 and 2, as seen on the level A-A of FIG. 1. FIG. 3 shows, with a dashed line, the polygonal cross section, with sixteen corners 62, of the upper portion 20 of the particle separator 14. The top wall 60 of the heat exchange chamber is surrounded by four side walls 32, 32', 32" and 32'''. At the center of the top wall 60 of the heat exchange chamber 16 is an opening 64 for a plate seal connection of the lower end 26 of the particle separator 14 to the heat exchange chamber 16.

In FIG. 3 is clearly seen the rectangular shape formed by the four vertically oriented steam tubes 46, as well as that formed by the first beams 52, 52' and the second beams 56, 56'. Four intermediate hanger rods 54 connect the end portions of the first beams 52, 52' to those of the second beams 56, 56'. The second beams 56, 56' are connected by multiple lower hanger rods 58 to two opposite edge portions of the top wall 60 of the heat exchange chamber 16.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such a combination is technically feasible.

The invention claimed is:

1. An assembly of a particle separator module and a heat exchange chamber module connectable in a vertical position to a circulating fluidized bed boiler, the assembly comprising:
   (A) the heat exchange chamber module that comprises a top surface; and
   (B) the particle separator module, which is top-supportable, and comprises a cylindrical upper portion with an outer wall having a tube wall construction, a conical lower portion, and a lower end that is sealably connectable to the top surface of the heat exchange chamber module so as to convey particles from the particle separator module to the heat exchange chamber module when in use in connection with the circulating fluidized bed boiler, the particle separator module further comprising:
      (a) 2N vertically aligned steam tubes, wherein N is an integer greater than one, each of the vertically aligned steam tubes being attached to the cylindrical upper portion and extending downwards to a predetermined level located between the cylindrical upper portion and the lower end; and
      (b) N first beams, wherein each of the 2N vertically aligned steam tubes is attached to one of the N first beams so that each of the N first beams is suspended to hang in a horizontal position at the predetermined level by two adjacent steam tubes of the 2N vertically aligned steam tubes,
   wherein the heat exchange chamber module is provided with N second beams attached in a horizontal position to the top surface of the heat exchange chamber module, and the heat exchange chamber module is arranged to be suspended from the particle separator module by having each of the N second beams suspended by two adjacent beams of the N first beams.

2. An assembly of a particle separator module and a heat exchange chamber module according to claim 1, wherein each of the vertically aligned steam tubes is attached in an attaching region on the outer wall of the cylindrical portion.

3. An assembly of a particle separator module and a heat exchange chamber module according to claim 2, wherein the attaching region extends at least two meters in a vertical direction along the outer wall of the cylindrical upper portion of the particle separator module.

4. An assembly of a particle separator module and a heat exchange chamber module according to claim 2, wherein N equals two and the attaching region forms a rectangular pattern in a horizontal direction, the top surface of the heat exchange chamber module comprising two opposite edge portions parallel to each other, and the two second beams being attached to the two opposite edge portions of the top surface.

5. An assembly of a particle separator module and a heat exchange chamber module according to claim 4, wherein the heat exchange chamber module is arranged to be suspended from the particle separator module by having the two second beams disposed perpendicular to the two first beams.

6. An assembly of a particle separator module and a heat exchange chamber module according to claim 1, wherein the heat exchange chamber module is arranged to be suspended from the particle separator module by having the N second beams suspended from the N first beams by 2N intermediate hanger rods, each of the intermediate hanger rods attaching an end section of a first beam to an adjacent end section of a second beam.

7. An assembly of a particle separator module and a heat exchange chamber module according to claim 1, wherein the cylindrical upper portion of the particle separator has a polygonal horizontal cross section and comprises 2M corner sections, wherein M is an integer greater than one and M is greater than or equal to N, and each of the 2N vertically aligned steam tubes being attached to one of the corner sections.

8. An assembly of a particle separator module and a heat exchange chamber module according to claim 7, wherein the cylindrical upper portion of the particle separator comprises an arrangement in which, between each two corners, is attached a vertically aligned steam tube and an equal number of corners, wherein is not attached a vertically aligned steam tubes.

9. An assembly of a particle separator module and a heat exchange chamber module according to claim 7, wherein the cylindrical upper portion of the particle separator comprises and arrangement in which, between each two corners, is attached a vertically aligned steam tube and an even number of corners, wherein is not attached a vertically aligned steam tube.

10. An assembly of a particle separator module and a heat exchange chamber module according to claim 9, wherein M equals eight and N equals two, and the sequential numbers of corners wherein, is not attached a vertically aligned steam tube between each two corners and wherein, is attached a steam tube, vary as 4-2-4-2.

11. An assembly of a particle separator module and a heat exchange chamber module according to claim 1, wherein the heat exchange chamber module has a tube wall construction that is arranged not to be in direct flow connection with the tube wall constructions of the cylindrical upper portion of the particle separator module when in use in the circulating fluidized bed boiler.

12. An assembly of a particle separator module and a heat exchange chamber module according to claim 1, wherein the lower end is sealably connected to the top surface of the heat exchange chamber module by a plate seal.

13. A method of installing an assembly of a particle separator module and a heat exchange chamber module according to claim 1, to a supporting construction of a circulating fluidized bed boiler plant, the method comprising the steps of:
supporting the particle separator module from above to the supporting construction of the circulating fluidized bed boiler plant; and
suspending the heat exchange chamber module from the particle separator module by having each of the N second beams suspended by two adjacent beams of the N first beams.

14. A method of installing an assembly of a particle separator module and a heat exchange chamber module according to claim 13, wherein N equals two, and further comprising the step of suspending the heat exchange chamber module from the particle separator module by having the two second beams disposed perpendicular to the two first beams.

15. A method of installing an assembly of a particle separator module and a heat exchange chamber module according to claim 13, further comprising the step of suspending the heat exchange chamber module from the particle separator module by having the N second beams suspended from the N first beams by means of 2N intermediate hanger rods, each of the intermediate hanger rods attaching an end section of a first beam to an adjacent end section of a second beam.

16. A circulating fluidized bed boiler comprising:
an assembly of a particle separator module and a heat exchange chamber module connectable in a vertical position to the circulating fluidized bed boiler, the assembly comprising:
(A) the heat exchange chamber module that comprises a top surface; and
(B) the particle separator module, which is top-supportable, and comprises a cylindrical upper portion with an outer wall having a tube wall construction, a conical lower portion, and a lower end that is sealably connectable to the top surface of the heat exchange chamber module so as to convey particles from the particle separator module to the heat exchange chamber module when in use in connection with the circulating fluidized bed boiler, the particle separator module further comprising:
(a) 2N vertically aligned steam tubes, wherein N is an integer greater than one, each of the vertically aligned steam tubes being attached to the cylindrical upper portion and extending downwards to a predetermined level located between the cylindrical upper portion and the lower end; and
(b) N first beams, wherein each of the 2N vertically aligned steam tubes is attached to one of the N first beams so that each of the N first beams is suspended to hang in a horizontal position at the predetermined level by two adjacent steam tubes of the 2N vertically aligned steam tubes,
wherein the heat exchange chamber module is provided with N second beams attached in a horizontal position to the top surface of the heat exchange chamber module, and the heat exchange chamber module is arranged to be suspended from the particle separator module by having each of the N second beams suspended by two adjacent beams of the N first beams.

17. A circulating fluidized bed boiler according to claim 16, wherein each of the vertically aligned steam tubes is attached in an attaching region on the outer wall of the cylindrical portion.

18. A circulating fluidized bed boiler according to claim 17, wherein the attaching region extends at least two meters in a vertical direction along the outer wall of the cylindrical upper portion of the particle separator module.

19. A circulating fluidized bed boiler according to claim 17, wherein N equals two and the attaching region forms a rectangular pattern in a horizontal direction, the top surface of the heat exchange chamber module comprising two opposite edge portions parallel to each other, and the two second beams being attached to the two opposite edge portions of the top surface.

20. A circulating fluidized bed boiler according to claim 19, wherein the heat exchange chamber module is arranged to be suspended from the particle separator module by having the two second beams disposed perpendicular to the two first beams.

21. A circulating fluidized bed boiler according to claim 20, wherein the cylindrical upper portion of the particle separator comprises and arrangement in which, between each two corners, is attached a vertically aligned steam tube and an even number of corners, wherein is not attached a vertically aligned steam tube.

22. A circulating fluidized bed boiler according to claim 16, wherein the heat exchange chamber module is arranged to be suspended from the particle separator module by having the N second beams suspended from the N first beams by 2N intermediate hanger rods, each of the intermediate hanger rods attaching an end section of a first beam to an adjacent end section of a second beam.

23. A circulating fluidized bed boiler according to claim 22, wherein the cylindrical upper portion of the particle separator comprises and arrangement in which, between each two corners, is attached a vertically aligned steam tube and an equal number of corners, wherein is not attached a vertically aligned steam tubes.

24. A circulating fluidized bed boiler according to claim 23, wherein M equals eight and N equals two, and the sequential numbers of corners, wherein is not attached a vertically aligned steam tube between each two corners and wherein, is attached a steam tube, vary as 4-2-4-2.

25. A circulating fluidized bed boiler according to claim 16, wherein the cylindrical upper portion of the particle separator has a polygonal horizontal cross section and comprises 2M corner sections, wherein M is an integer greater than one and M is greater than or equal to N, and each of the 2N vertically aligned steam tubes being attached to one of the corner sections.

26. A circulating fluidized bed boiler according to claim 16, wherein the heat exchange chamber module has a tube wall construction that is arranged not to be in direct flow connection with the tube wall constructions of the cylindrical upper portion of the particle separator module when in use in the circulating fluidized bed boiler.

27. A circulating fluidized bed boiler according to claim 16, wherein the lower end is sealably connected to the top surface of the heat exchange chamber module by a plate seal.

* * * * *